(12) United States Patent
Barada et al.

(10) Patent No.: US 6,455,966 B1
(45) Date of Patent: Sep. 24, 2002

(54) MAGNETIC BEARING DEVICE FOR MOTOR-COMBINED STRUCTURE

(75) Inventors: Toshimitsu Barada, Tokyo (JP);
Atsushi Ooyama, Fujisawa (JP);
Toshiharu Nakazawa, Chigasaki (JP);
Shinichi Sekiguchi, Yokohama (JP);
Masakazu Komai, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/660,292

(22) Filed: Sep. 12, 2000

(30) Foreign Application Priority Data

Sep. 13, 1999 (JP) .......................... 11-259363

(51) Int. Cl.[7] .................................. H02K 7/09
(52) U.S. Cl. .................................... 310/90.5
(58) Field of Search ................ 310/90.5; 318/721; 323/234; F04B 49/02; H02K 7/09

(56) References Cited

U.S. PATENT DOCUMENTS 5,961,291 A * 10/1999 Sakagami et al. ......... 415/132
6,208,051 B1 * 3/2001 Ando ........................... 310/90
6,380,652 B1 * 4/2002 Ueyama et al. ............ 310/90.5

FOREIGN PATENT DOCUMENTS

JP 02-215996 8/1990

* cited by examiner

*Primary Examiner*—Nestor Ramirez
*Assistant Examiner*—Karen B Addison
(74) *Attorney, Agent, or Firm*—Armstrong, Westerman, Hattori, LLP

(57) ABSTRACT

A magnetic bearing device for use with a motor-combined structure having magnetic bearings supporting a rotatable shaft out of contact therewith and a motor for rotating the rotatable shaft. A common power supply supplies electric power to the magnetic bearings and the motor, and a motor drive power supply limits variations of the electric power supplied to the motor to at most a predetermined level with respect to variations of electric power supplied to the common power supply.

3 Claims, 2 Drawing Sheets

MAGNETIC BEARING DEVICE FOR MOTOR-COMBINED STRUCTURE

BACKGROUND OF THE INVENTION

1. Field of the Invention

The present invention relates to a magnetic bearing device for use with a motor-combined structure, and more particularly to a magnetic bearing device having magnetic bearings which supports a rotatable shaft that is rotated by a motor armature mounted on the rotatable shaft and a motor stator disposed around the motor armature.

2. Description of the Related Art

FIG. 1 of the accompanying drawings shows a conventional magnetic bearing device for use with a motor-combined structure. As shown in FIG. 1, the motor-combined structure has a rotatable shaft 11 that is rotated by a revolving magnetic field generated by a motor stator 13 which is disposed around a motor armature 12 mounted centrally on the rotatable shaft 11. The motor armature 12 and the motor stator 13 make up a motor. The magnetic bearing device has magnetic bearings 14A, 14B disposed around the rotatable shaft 11 one on each side of the motor stator 13. Each of the magnetic bearings 14A, 14B comprises a magnetic member 15 fixed to the rotatable shaft 11 and electromagnets 16 for producing magnetic fluxes to apply magnetic attractive or repulsive forces to the magnetic member 15 to levitate and hold the rotatable shaft 11 in a predetermined position.

Displacement sensors 17A, 17B for detecting a positional displacement of the rotatable shaft 11 are disposed respectively near the magnetic bearings 14A, 14B. The displacement sensors 17A, 17B supply detected positional displacement signals to a magnetic bearing controller 18. In the magnetic bearing controller 18, a displacement sensor signal detector 18A detects the detected positional displacement signals from the displacement sensors 17A, 17B, and a compensating circuit 18B generates a signal for levitating and supporting the rotatable shaft 11 in a desired target position from an output signal from the displacement sensor signal detector 18A. The signal generated by the compensating circuit 18B is amplified by a driver 18C, which supplies the amplified signal to the electromagnets 16. The rotatable shaft 11 is levitated and supported in the desired target position based on positional displacements of the rotatable shaft 11 that are detected by the sensors 17A, 17B.

The magnetic bearing controller 18 is supplied with electric power directly from a commercial three-phase AC power supply 20, and the motor stator 13 is supplied with electric power from the AC power supply 20 via a switch 21.

The magnetic bearing controller 18 converts the supplied electric power to electric power for generating control forces to act on the rotatable shaft 11. The converted electric power is supplied from the magnetic bearing controller 18 to the electromagnets 16.

When the conventional magnetic bearing device starts to operate, the magnetic bearing controller 18 is activated to control the magnetic bearings 14A, 14B to levitate the rotatable shaft 11. Thereafter, the switch 21 is closed to supply electric power from the AC power supply 20 to the motor stator 13. The motor armature 12 fixedly mounted on the rotatable shaft 11 starts rotating under a revolving magnetic field generated by the motor stator 13. A certain period of time after the motor armature 12 starts rotating, the rotatable shaft 11 rotates at a rated rotational speed.

If the voltage of the electric power supplied to the AC power 20 varies for some reason while the motor is in operation, then the motor is subject to a change in the voltage of the electric power supplied thereto which is commensurate with the variation of the voltage of the electric power supplied to the AC power supply 20. Specifically, because the motor stator 13 is connected to the AC power supply 20 via the switch 21, the motor directly undergoes the variation of the voltage of the electric power supplied to the AC power supply 20. When the voltage applied to the motor stator 13 varies, the drive torque applied to rotate the motor armature 12 also varies. The variation of the drive torque causes a variation of unbalanced magnetic forces produced between the motor armature 12 and the magnetic poles of the motor stator 13. The variation of unbalanced magnetic forces is transmitted through the rotatable shaft 11 to the magnetic bearings 14A, 14B.

In view of possible variations of unbalanced magnetic forces produced between the motor armature 12 and the motor stator 13 due to changes in the power supply voltage applied to the motor, the magnetic bearing controller 18 is arranged to change its output characteristics in order to prevent such variations from adversely affecting the levitation control performed thereby. Specifically, if the voltage from the AC power supply 20 changes, then the magnetic bearing controller 18 adjusts its output characteristics to provide control characteristics depending on the power supply voltage or changes control characteristic settings based on the supplied voltage.

Inasmuch as the motor armature of the motor is integrally fixed to the rotatable shaft, the motor operates normally when the motor armature rotates at the rated rotational speed, and the magnetic levitation control characteristics of the magnetic bearing device are determined on the assumption that unbalanced magnetic forces produced between the motor armature and the motor stator are substantially constant when the motor armature rotates at the rated rotational speed. If the unbalanced magnetic forces produced between the motor armature and the motor stator are changed, then the magnetic levitation control characteristics of the magnetic bearing device vary, possibly resulting in a control failure in the worst case.

If a power supply voltage that is available to the installation site for the magnetic bearing device cannot be specified, or if it is assumed that the voltage applied to the magnetic bearing device is variable over a certain wide range for the purpose of using the magnetic bearing device in numerous applications, then control characteristics of the magnetic bearing device tend to vary as a result of a variation of the unbalanced magnetic forces produced in the motor. However, it is tedious and time-consuming to adjust or modify the magnetic bearing device each time when control characteristics of the magnetic bearings vary.

SUMMARY OF THE INVENTION

It is therefore an object of the present invention to provide a magnetic bearing device for stably controlling magnetic bearings at all times without having to readjust control characteristics of magnetic bearings and change settings thereof.

To achieve the above object, there is provided in accordance with the present invention a magnetic bearing device for use with a motor-combined structure, comprising magnetic bearings for supporting a rotatable shaft out of contact therewith, a motor for rotating the rotatable shaft, a common power supply for supplying electric power to the magnetic bearings and the motor, and a motor drive power supply for limiting variations of the electric power supplied to the motor to at most a predetermined level with respect to variations of electric power supplied to the common power supply.

The motor drive power supply controls the voltage of electric power to be supplied to the motor. Even if the voltage of electric power supplied to the common power supply varies over a certain range, the motor drive power supply can hold variations of the voltage of the electric power to be supplied to the motor within a predetermined range. Regardless of variations of the voltage of the electric power supplied to the common power supply, therefore, the motor is supplied with electric power at a substantially constant voltage. Consequently, unbalanced magnetic forces produced between a motor armature and a motor stator of the motor can be held at a constant level or less at all times. The magnetic bearings which levitate and support the rotatable shaft can be controlled stably regardless of variations of the voltage of the electric power supplied to the common power supply. The unbalanced magnetic forces held at a constant level or less are prevented from adversely affecting the magnetic bearings via the rotatable shaft, making it unnecessary to readjust or replace the magnetic bearings. The magnetic bearings can thus be operated stably even in installation sites where the voltage of the common power supply varies in a relatively wide range.

Preferably, the motor drive power supply comprises an input/output voltage monitor unit for detecting an input voltage from the common power supply and an output voltage to be applied to the motor, a processing unit for generating a control signal to make the output voltage constant based on a variation of the input voltage supplied from the common power supply to the motor drive power supply, and an output unit for supplying a constant output voltage to the motor regardless of variations of the input voltage from the common power supply.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
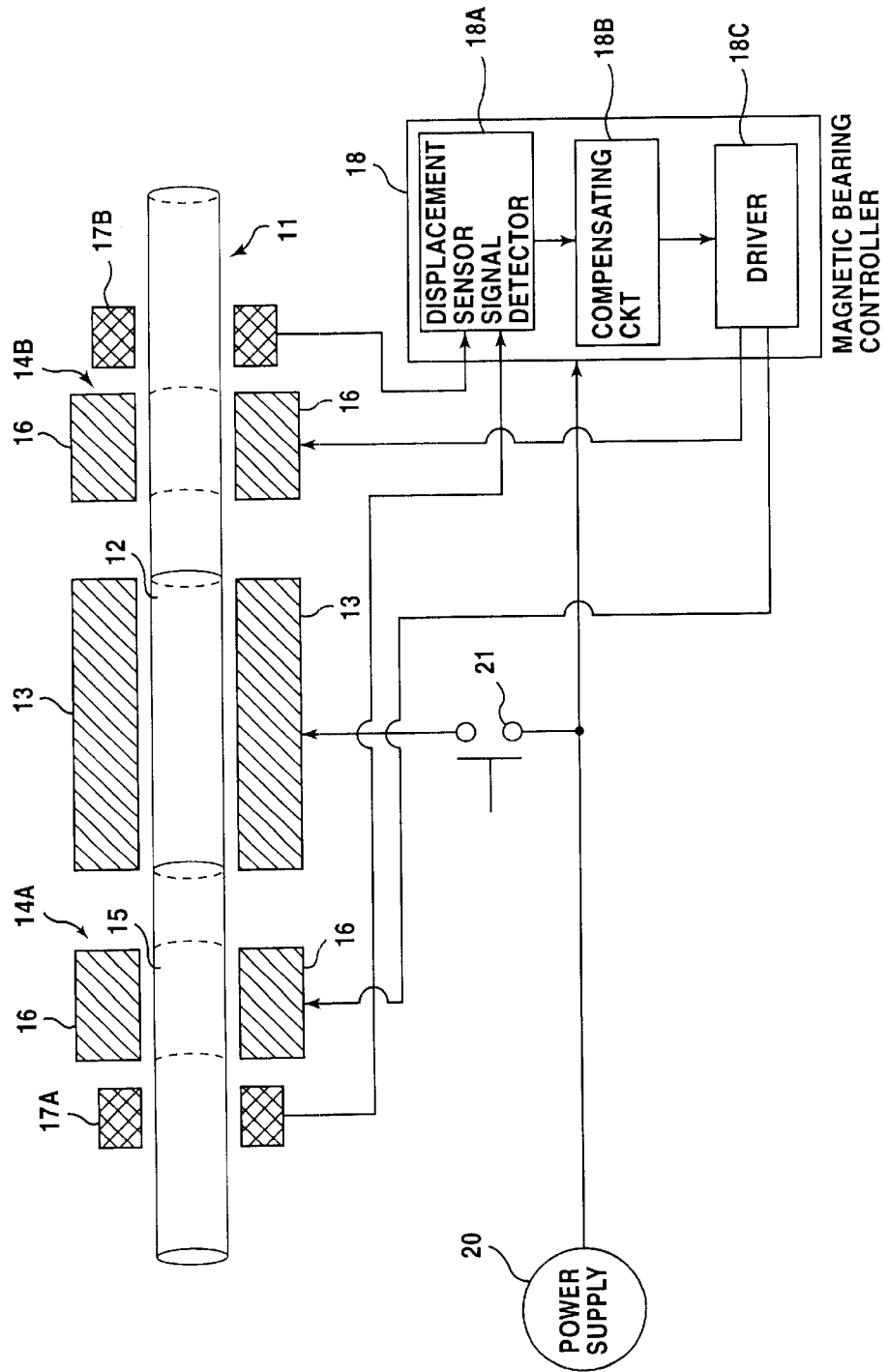
FIG. 1 is a cross-sectional view, partly in block form, of a conventional magnetic bearing device for use with a motor-combined structure.

A magnetic bearing device for use with a motor-combined structure according to the present invention will be described below with reference to FIG. 2. Those parts of the magnetic bearing device shown in FIG. 2 which are identical or correspond to those of the conventional magnetic bearing device shown in FIG. 1 are denoted by identical or corresponding reference characters.

Figure 2:
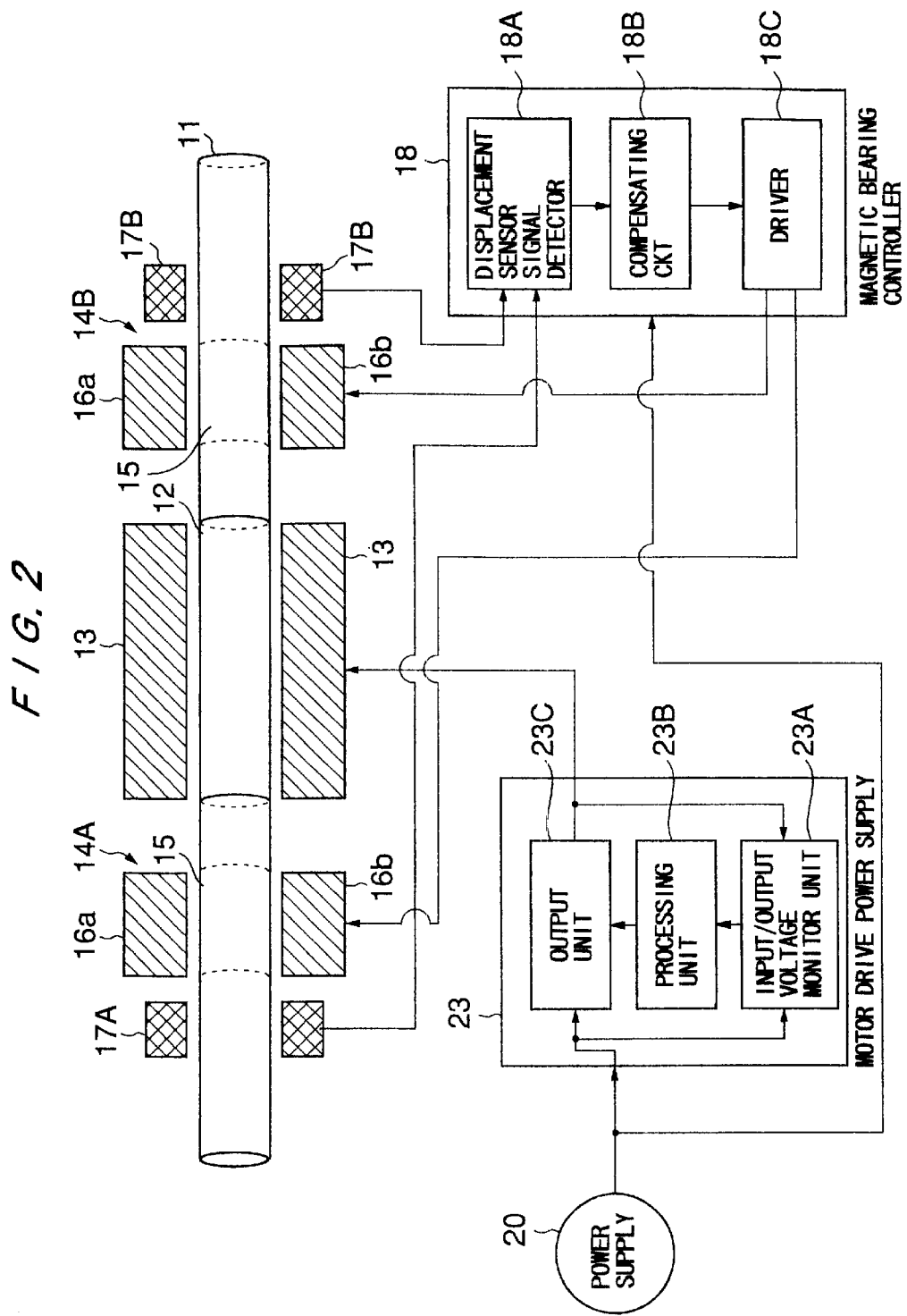
FIG. 2 is a cross-sectional view, partly in block form, of a magnetic bearing device for use with a motor-combined structure according to the present invention.

As shown in FIG. 2, a rotatable shaft 11 has opposite end portions levitated and supported by a pair of magnetic bearings 14A, 14B out of contact therewith. The rotatable shaft 11 is rotated by a revolving magnetic field generated by a motor stator 13 which is disposed around a motor armature 12 mounted centrally on the rotatable shaft 11. However, the motor armature 12 may not be mounted centrally on the rotatable shaft 11. The motor armature 12 and the motor stator 13 make up a motor. Each of the magnetic bearings 14A, 14B comprises a magnetic member 15 fixed to the rotatable shaft 11 and electromagnets 16a, 16b for producing magnetic fluxes to apply magnetic attractive forces to the magnetic member 15 to levitate and hold the rotatable shaft 11 in a predetermined target position. While each of the magnetic bearings 14A, 14B is shown as having two electromagnets 16a, 16b, it actually has a plurality of pairs of electromagnets disposed around the rotatable shaft 11.

Displacement sensors 17A, 17B for detecting a positional displacement of the rotatable shaft 11 are disposed respectively near the magnetic bearings 14A, 14B. The displacement sensors 17A, 17B supply detected positional displacement signals to a magnetic bearing controller 18, which controls currents supplied to the electromagnets 16a, 16b to levitate the rotatable shaft 11 in a desired target position based on the detected positional displacement signals. The magnetic bearing controller 18 has a displacement sensor signal detector 18A, a compensating circuit 18B, and a driver 18C as is the case with the conventional magnetic bearing controller 18 shown in FIG. 1.

According to the present invention, the magnetic bearing device has a motor drive power supply 23 for applying a constant voltage to the motor irrespective of variations of the voltage from a commercial three-phase AC power supply 20. The motor drive power supply 23 comprises an input/output voltage monitor unit 23A, a processing unit 23B, and an output unit 23C.

The input/output voltage monitor unit 23A detects an input voltage from the commercial three-phase AC power supply 20 and an output voltage to be applied to the motor stator 13. The processing unit 23B generates a control signal to make the output voltage constant based on a variation of the input voltage supplied from the commercial three-phase AC power supply 20 to the motor drive power supply 23. The generated control signal is supplied to the output unit 23C, which supplies a corrected voltage of constant value to the motor stator 13. The output unit 23C comprises an inverter device, for example, and can adjust only the power supply voltage to a predetermined target value without changing the frequency thereof.

The motor drive power supply 23 can adjust any variations of the outputted voltage to or within a certain range. Therefore, even if the voltage from the commercial three-phase AC power supply 20 varies after the motor has been operating at a rated rotational speed, the motor drive power supply 23 can make the output voltage constant and supply the constant voltage to the motor. In this manner, unbalanced magnetic forces produced between the motor armature 12 and the motor stator 13 are maintained within a certain range, making constant the levitation control characteristics of the magnetic bearings for stable operation of the magnetic bearing device.

A process of operating the magnetic bearing device will be described below. First, the commercial three-phase AC power supply 20 supplies electric power to the magnetic bearing controller 18 to activate the magnetic bearing controller 18. The magnetic bearing controller 18 starts performing levitation control on the magnetic bearings 14A, 14B. The displacement sensors 17A, 17B detect a levitated position of the rotatable shaft 11. In order to levitate and support the rotatable shaft 11 in a desired target position, a signal detected by the displacement sensor signal detector 18A of the magnetic bearing controller 18 is applied to the compensating circuit 18B, which generates a control signal.

The control signal is amplified by the driver 18C and then supplied to the electromagnets 16a, 16b of each of the magnetic bearings 14A, 14B. The rotatable shaft 11 is now levitated and supported in the desired target position.

If the levitated position of the rotatable shaft 11 varies for some reason, then the displacement thereof is detected by the displacement sensors 17A, 17B. Based on the detected displacement, the magnetic bearing controller 18 carries out a feedback control process to displace the rotatable shaft 11 back to the target position. When the motor armature fixed to the rotatable shaft 11 is supplied with electric power to generate a torque from the motor stator 13, unbalanced magnetic forces as well as a revolving magnetic field are produced between the motor armature 12 and the motor stator 13, generating forces in a direction tending to turn the rotatable shaft 11 in an oscillating manner. The oscillationally rotating force is transmitted to the rotatable shaft 11 and acts as a reaction on the magnetic bearings 14A, 14B where it causes the rotational shaft 11 to be displaced. The displacement thus produced is to be controlled by the feedback control process according to the magnetic levitation control characteristics of the magnetic bearing device.

Generally, the magnetic bearings 14A, 14B are controlled by the feedback control process to bear the total weight of the rotatable shaft 11 and the armature 12 fixed thereto and also an inertial force produced by the oscillationally rotating force when the motor operates at a rated rotational speed, for thereby keeping the rotatable shaft 11 in the desired target levitated position. If the voltage from the commercial three-phase AC power supply 20 varies, and if the electric power were supplied therefrom to the motor via the switch 21 as is conventional, then unbalanced forces are applied between the motor armature 12 and the motor stator 13, thus varying the force acting on the rotational shaft 11. As a consequence, the magnetic levitation control characteristics of the magnetic bearing device would also vary.

According to the present invention, in order to solve the above problems, the magnetic bearing device has the motor drive power supply 23 for applying a constant voltage to the motor irrespective of variations of the voltage from the commercial three-phase AC power supply 20. Even if the voltage from the commercial three-phase AC power supply 20 varies after the motor has been operating at a rated rotational speed, the motor drive power supply 23 can make the output voltage constant and supply the constant voltage to the motor.

After the motor has started to operate and until the motor operates at a rated rotational speed, i.e., while unbalanced magnetic forces produced between the motor armature 12 and the motor stator 13 are varying most frequently, then the magnetic bearings tend to become unstable. However, during the short period of time after the motor has started to operate and until the motor operates at a rated rotational speed, the voltage from the commercial three-phase AC power supply 20 is less likely to vary. Therefore, only when the motor starts to operate, the voltage from the commercial three-phase AC power supply 20 may be applied to the input/output voltage monitor unit 23A, and the processing unit 23B may generate a control signal to make the output voltage constant based on the applied voltage. In this manner, unbalanced magnetic forces produced between the motor armature 12 and the motor stator 13 may be maintained within a certain range, making constant the levitation control characteristics of the magnetic bearings 14A, 14B. Consequently, the magnetic bearing device for use with the motor-combined structure can stably be operated regardless of variations of the voltage from the commercial three-phase AC power supply 20.

The magnetic bearing device for use with the motor-combined structure can be installed in a wide variety of rotary machines including pumps, fans, etc., and allows the rotary machines to operate stably even if the voltage of the power supply available at the installation site varies in a wide range.

Although a certain preferred embodiment of the present invention has been shown and described in detail, it should be understood that various changes and modifications may be made therein without departing from the scope of the appended claims.

What is claimed is:

1. A magnetic bearing device comprising:

magnetic bearings for supporting a rotatable shaft out of contact therewith;

a motor for rotating said rotatable shaft;

a common power supply for supplying electric power to said magnetic bearings and said motor; and a motor drive power supply for limiting variations of the electric power supplied to said motor to at most a predetermined level with respect to variations of electric power supplied to said common power supply, wherein said motor drive power supply comprises:

an input/output voltage monitor unit for detecting an input voltage from said common power supply and an output voltage to be applied to said motor;

a processing unit for generating a control signal to make said output voltage constant based on a variation of said input voltage supplied from said common power supply to said motor drive power supply; and an output unit for supplying a constant output voltage to said motor regardless of variations of the input voltage from said common power supply.

2. A magnetic bearing device according to claim 1, wherein said motor drive power supply comprises an inverter device, which is able to adjust only power supply voltage without changing frequency thereof.

3. A magnetic bearing device according to claim 1, wherein said magnetic bearing device is installed in a rotary machine, which includes a pump or a fan.

* * * * *